US008452833B2

(12) United States Patent
Hawkins et al.

(10) Patent No.: US 8,452,833 B2
(45) Date of Patent: May 28, 2013

(54) CACHED MESSAGE DISTRIBUTION VIA HTTP REDIRECTS

(75) Inventors: John C. Hawkins, Hampshire (GB); Matthew R. Whitehead, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 628 days.

(21) Appl. No.: 12/119,966

(22) Filed: May 13, 2008

(65) Prior Publication Data
US 2009/0287761 A1 Nov. 19, 2009

(51) Int. Cl.
*H06F 15/16* (2006.01)
(52) U.S. Cl.
USPC ........... 709/202; 709/203; 709/213; 709/217; 709/212; 715/201; 715/230; 715/720
(58) Field of Classification Search
USPC .................. 709/202, 203, 216, 217; 707/740, 707/741
See application file for complete search history.

(56) References Cited

U.S. PATENT DOCUMENTS

| | | | |
|---|---|---|---|
| 6,119,167 A * | 9/2000 | Boyle et al. | 709/234 |
| 6,167,438 A * | 12/2000 | Yates et al. | 709/216 |
| 7,039,671 B2 | 5/2006 | Cullen | |
| 7,051,118 B2 | 5/2006 | Collison | |
| 7,080,158 B1 | 7/2006 | Squire | |
| 7,080,385 B1 | 7/2006 | Collison et al. | |
| 7,136,930 B1 * | 11/2006 | Leppinen | 709/238 |
| 7,254,616 B1 | 8/2007 | Ennis et al. | |
| 7,334,019 B2 | 2/2008 | Quick et al. | |
| 2001/0018698 A1 * | 8/2001 | Uchino et al. | 707/533 |
| 2001/0032267 A1 * | 10/2001 | Collison | 709/230 |

(Continued)

OTHER PUBLICATIONS

"A Taxonomy of JavaScript Redirection Spam"—Kumar Chellapilla & Alexey Maykov, May 1, 2007. airweb.cse.lehigh.edu/2007/papers/paper_115.*

(Continued)

*Primary Examiner* — Krista Zele
*Assistant Examiner* — Randy Scott
(74) *Attorney, Agent, or Firm* — Scully, Scott, Murphy & Presser, P.C.; Robert Straight

(57) ABSTRACT

A method for distributing cached messages in a load-balanced publish/subscribe messaging network using an HTTP redirect in response to an HTTP client message request is disclosed. The redirect response including a URI at which a next message in a list of sequential messages slated for the HTTP client per the request is located, wherein the HTTP client uses the URI to automatically iterate through and receive the entire list of sequential messages. The method includes that a) the HTTP client initiating a request for a next message in a sequence of messages, b) the HTTP server receiving the request and creating and inserting a client cursor in a message cache for the HTTP a cache location of the requested next message, and returning an HTTP redirect response to the HTTP client including the current client cursor cache location for the requested next message in a location field in the redirect response enabling the HTTP client to automatically access each next message in the sequence and c) the HTTP client receiving the redirect response, opens (sends) a new request to the client cursor location in accordance with the URI location field in the redirect response to secure the next message, Steps b) and c) are repeated until the HTTP server returns a response other than a redirect response, or until the HTTP client fails to respond to a redirect response. The method, system and computer program product supports point-to-point messaging.

16 Claims, 2 Drawing Sheets

U.S. PATENT DOCUMENTS

| | | | |
|---|---|---|---|
| 2002/0147810 A1* | 10/2002 | Traversat et al. | 709/224 |
| 2005/0065632 A1 | 3/2005 | Douglis et al. | |
| 2006/0069587 A1 | 3/2006 | Banks et al. | |
| 2006/0190607 A1 | 8/2006 | Lowery et al. | |
| 2007/0022430 A1 | 1/2007 | Barker et al. | |
| 2007/0050522 A1 | 3/2007 | Grove et al. | |
| 2007/0101341 A1 | 5/2007 | Downing et al. | |
| 2007/0157213 A1 | 7/2007 | Koegel | |
| 2009/0070346 A1* | 3/2009 | Savona et al. | 707/100 |

OTHER PUBLICATIONS

"Web Distributed Authoring and Versioning Redirect Reference Resources"—Whitehead et al, IBM, Mar. 2006 www.webdav.org/specs/rfc3744.pdf.*

Sean Neville, Enterprise Integration Patterns: Emerging Standards and Futures in Enterprise Integration, http://www.enterpriseintegrationpatterns.com/Future.html.

* cited by examiner

CACHED MESSAGE DISTRIBUTION VIA HTTP REDIRECTS

BACKGROUND OF THE INVENTION

The invention relates to messaging broadly, and more particularly relates to a novel system and method for publish/subscribe and point-to-point messaging where multiple HTTP clients requesting next messages maintained in a cache receive a redirect response to each request that identifies a URI for the next message location in the cache using a location field in a standard HTTP redirect mechanism, thereby allowing the HTTP client to automatically iterate through a sequence of next messages so stored.

Publish/subscribe is an asynchronous messaging technology whereby senders publishers of messages) do not send or publish messages to specific receivers (subscribers of messages), but to topics, or named logical channels. Messages are collections of binary or character data that have some meaning to a participating program. Publish/subscribe data processing systems have become very popular in recent years as a way of distributing data messages (publications between application programs). Publishers are typically not concerned with where their publications are going, and subscribers are typically not interested in where the messages they receive have come from. Published messages are characterized into classes without knowledge or regard to which subscribers (if any) should receive the messages such that subscribers typically receive only a subset of total messages published. The publisher is responsible for defining the classes of messages to which subscribers can subscribe.

Publish/subscribe systems may be either topic or content based. In a topic-based system, messages are published to topics or channels associated by topic. In a content-based system, messages are delivered only to subscribers where attributes or message content matches constraints defined by the subscriber, who is responsible for classifying the messages. Publishers and subscribers may also interact with a network of message brokers, each one of which propagates subscriptions and forwards publications to other brokers within the network. Publish/subscribe systems include a message queue manager, a configuration manager and depending on need, a message broker. In such an arrangement, the message broker typically assures the integrity of the message source, and manages the distribution of messages according to valid subscriptions registered with the message broker. A configuration manager drives deployment, including storing and managing configuration data used to configure brokers, and hosted by the message queue manager.

Publish/subscribe systems evolved from WebSphere MQ™, where the WebSphere MQ platform now implements an HTTP interface. As in other communication protocols, storage, routing, and delivery information is added to the message before transmission, and stripped from the message prior to delivery to the receiving application. Message queues are objects that store messages in an application. A queue Manager provides a logical container for the message queue. The queue manager (or message broker) is responsible for transferring data to other queue managers via message channels. Messages are not dependent upon pure packet-based transmissions, such as TCP/IP, to implement the sending publisher) and receiving (subscriber) ends to be decoupled, and potentially operate asynchronously, thereby. Messages are delivered once and once only, irrespective of errors and network problems.

WebSphere MQ networks, and like messaging networks support point-to-point messaging, for example, by use of WebSphere MQ link. WebSphere MQ link is defined on a messaging engine in the service integration bus, and describes the attributes required to connect to, and send or receive messages to or from a queue manager that acts as a gateway to other queue managers. Point-to-point messaging may comprise requests from an HTTP server to WebSphere MQ, optionally followed by a reply, and requests from a network optionally followed by an HTTP server reply.

Addressing messages where multiple clients have access to the same messages in a cache requires that each HTTP client, or each HTTP server, know where each client has read up to in the message cache. Each server maintains a message cache. Such operation effectively requires maintaining a cursor through the messages cache for each individual client. The cursor is typically stored in the HTTP server that maintains it. As such, the server maintains some affinity to the client and on each subsequent request for message(s), increments the cursor for that client. The cursor might also be stored in the HTTP client. Each client thereby "knows" their cursor's position in the cache, and before each request for a message, the client increments its own cursor.

Such conventional use of cursors to maintain a client's last read or next read message position in a cache has limitations. One limitation arises in situations where the message cursor is stored in the HTTP server. In such case, in a multi-server environment (i.e. multiple HTTP servers serviced by an HTTP load balancer), the cursor is shared between all HTTP servers comprising a cluster of HTTP servers. If the cursor is not "shared" between the HTTP servers, subsequent requests for messages by the client could very likely be routed to an HTTP server having no knowledge of that client's cursor.

A second limitation to the conventional use of cursors in a publish/subscribe messaging system arises where the message cursor is stored with the HTTP client. Storing the cursor with the client requires that the client have knowledge of its own message cursor, and requires that the client include the cursor information on each subsequent request. These limitations result in less than optimal messaging processing.

SUMMARY OF THE INVENTION

To that end, the present invention provides a system, method and computer program product with a set of executable instructions for implementing the method that overcomes the shortcomings of known publish/subscribe and point-to-point messaging technologies.

This invention overcomes the known limitations by providing a way for a client to locate the next message resource (i.e. the next message for that client) without the client having to be aware of its own context. By "its own context" is meant at which point in the cache their cursor is currently placed. The invention obviates the need for an HTTP server to maintain information about the cursor position for each client, allowing for multiple HTTP servers to serve a particular HTTP client without any need to share context information between them. The HTTP 1.1 standard defines mechanisms by which an HTTP server can redirect an HTTP client to a different URI than that URI which they initially requested. HTTP redirects can be made in one of three ways: HTTP 301 (Permanent Redirect); HTTP 307 (Temporary Redirect); and HTTP 302 (Undefined).

On any HTTP redirect response, a location field is required for inclusion in the redirect response. The location field indicates the new URI to which the client should be redirected. Additionally, and preferably, a hyperlink to the new URI is included in the body of the message. While preferred, this is not mandatory. The presence of the redirect URI in the obligatory location field allows the HTTP client to use the redirect response as a container for a client's message. Leaving the redirect URI out of the redirect response by the response entity is an acceptable messaging practice. Alternatively, the message body could contain both the redirect URI hyperlink, AND the client's message in a predetermined format.

In a method embodiment, the invention includes a method for distributing cached messages in a load-balanced publish/subscribe and/or and point-to-point messaging network using an HTTP redirect in response to an HTTP client message request, the redirect response including a URI at which a next message in a list of sequential messages slated for the HTTP client per the request is located, wherein the HTTP client uses the URI to automatically iterate through and receive the entire list of sequential messages. The method includes steps of: a) the HTTP client initiating a request for a next message in a sequence of messages, b) the HTTP server receiving the request and creating and inserting a client cursor in a message cache for the HTTP a cache location of the requested next message, and returning an HTTP redirect response to the HTTP client including the current client cursor cache location for the requested next message in a location field in the redirect response enabling the HTTP client to automatically access each next message in the sequence and c) the HTTP client receiving the redirect response, opens (sends) a new request to the client cursor location in accordance with the URI location field in the redirect response to secure the next message Steps b) and c) are repeated until the HTTP server returns a response other than a redirect response, or until the HTTP client fails to respond to a redirect response. The message cache may be located at the HTTP server, or at the HTTP client. For that matter, the message cache may be located at a location that is separate from the HTTP server and HTTP client. The method may embody computer readable instructions that are contained within a computer program product.

In a system embodiment, the invention includes a publish/subscribe and/or and point-to-point messaging system having a plurality of HTTP subscribers that request messages by topic (and/or content), a plurality of HTTP servers that respond to message requests by topic, a plurality of HTTP publishers associated with each HTTP server, which HTTP publishers respond to requests for messages by topic and a message cache for storing messages to be published, the message cache including client cursors associated with an HTTP client subscriber, inserted by one of the HTTP servers, identifying in the message cache the location of a "next" message for an HTTP client. The HTTP servers respond to a "next" message request by an HTTP client using a redirect response that includes the URI location of the HTTP client's next message, in the message cache, and wherein the HTTP client uses the URI location of the client cursor in the message cache to retrieve next messages in the sequence of messages slated for the HTTP client without need for context.

DESCRIPTION OF THE DRAWINGS

The foregoing and other objects, aspects and advantages will be better understood from the following detailed description of embodiments of the inventions, with reference to the drawings, in which.

DETAILED DESCRIPTION

The invention makes use of existing HTTP redirect mechanisms to allow a client to automatically iterate through a list of messages via (load-balanced) HTTP servers using an HTTP redirect response location field to include a new URI to which the client is redirected for the next message in a sequence of messages. The various method embodiments of the invention will be generally implemented by a computer executing a sequence of program instructions for carrying out the steps of the method, assuming all required data for processing is accessible to the computer. The sequence of program instructions may be embodied in a computer program product comprising media storing the program instructions.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the method, and variations on the method as described herein. Alternatively, a specific use computer, containing specialized hardware for carrying out one or more of the functional tasks of the invention, could be utilized.

Figure 1:
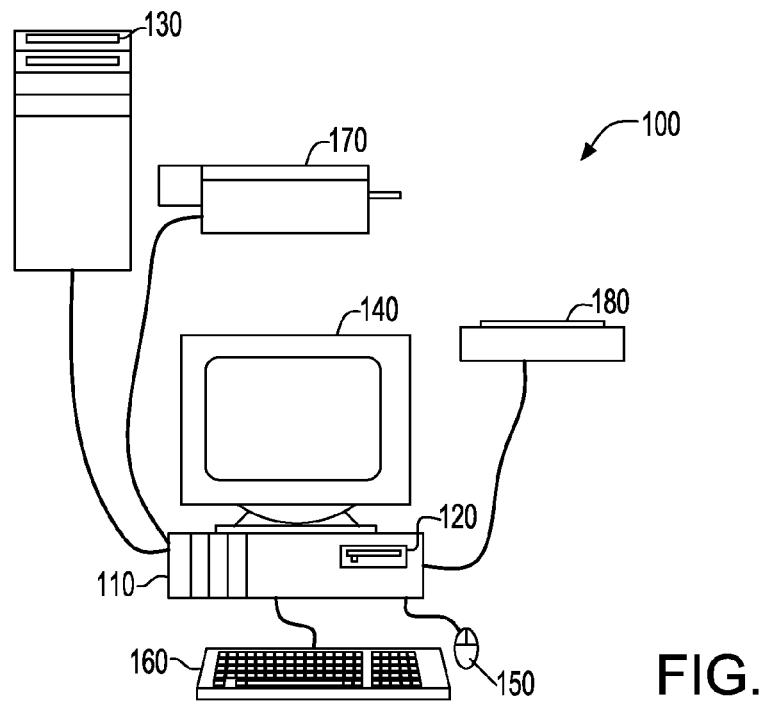
FIG. 1 is a representation of a general purpose computer system into which is provided a set of computer-readable instructions for implementing the inventive method for discriminating program code updates after merging for a live review.

A computer-based system (100) is depicted in FIG. 1 herein, by which the method of the present invention may be carried out. Computer-based system (100) includes a processing unit (110), which houses a processor, memory and other systems components (not shown expressly in the drawing figure) that implement a general purpose processing system, or computer that may execute a computer program product. The computer program product may comprise media, for example a compact storage medium such as a compact disc, which may be read by the processing unit (110) through a disc drive (120), or by any means known to the skilled artisan for providing the computer program product to the general purpose processing system for execution thereby.

The computer program product comprises all the respective features enabling the implementation of the inventive method described herein, and which—when loaded in a computer system—is able to carry out the method. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product may be stored on hard disk drives within processing unit (110), as mentioned, or may be located on a remote system such as a server (130), coupled to processing unit (110), via a network interface such as an Ethernet interface. Monitor (140), mouse (150) and keyboard (160) are coupled to the processing unit (110), to provide user interaction. Scanner (180) and printer (170) are provided for document input and output. Printer (170) is shown coupled to the processing unit (110) via a network connection, but may be coupled directly to the processing unit. Scanner (180) is shown coupled to the processing unit (110) directly, but it should be understood that peripherals might be network coupled, or direct coupled without affecting the ability of the processing unit (110) to perform the method of the invention.

Figure 2:
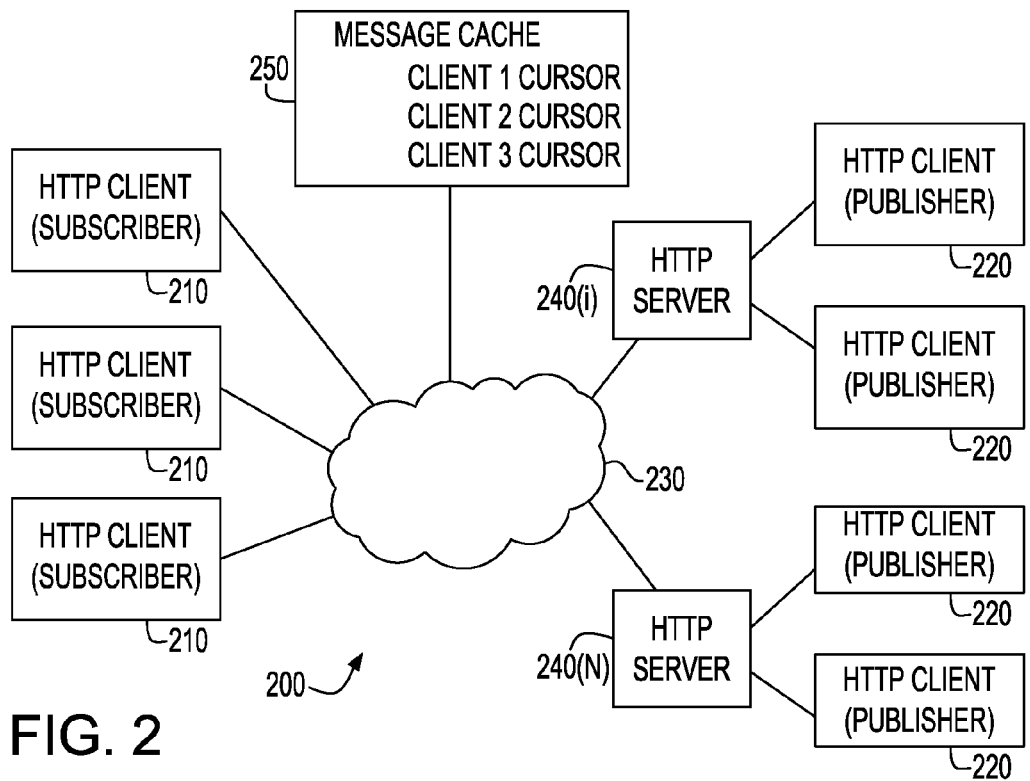
FIG. 2 is a schematic block diagram of a system for distributing cached messages in a load-balanced publish/subscribe messaging network with and point-to-point messaging that uses HTTP redirects.

In a preferred embodiment, the invention comprises a publish/subscribe system (200), preferably including and point-to-point messaging capability, for cached message distribution via HTTP redirects, as depicted in FIG. 2. System (200) includes at least one HTTP client (210; subscriber), in a role of HTTP subscriber, and at least one HTTP client (220; publisher) in a role of HTTP publisher in communication via a network infrastructure (230). The skilled artisan will note that the HTTP clients (210; subscribers) and HTTP clients (220; publishers) may operate interchangeably. The HTTP clients (220; publishers) are connected to network infrastructure (230) through HTTP cluster servers (240(1) . . . 240(N)). Messages for a specific topic are stored in a message cache (250), which may be located in any storage function available to network users. While message cache (250) would preferably be incorporated in an HTTP server, such as HTTP server 1, or HTTP server (N), the message cache is shown connected directly to the network (230) to highlight that same message cache may be at any accessible network location.

There are certain minimal requirements for inventive operation of the inventive method, system and computer program product. The first is that all HTTP servers in the load balanced, cluster environment (whether HTTP client subscriber (210), or HTTP client publisher 220) must be subscribed to the topic admin/subscriptions (or similar). In addition, all HTTP servers, on creating a subscription to a topic on behalf of a client, must maintain a history of messages published on that topic. This is so that the messages can be served to different clients at different times based on their "cursor" in the message history list, as shown in message cache (250) and identified as client 1 cursor, client 2 cursor and client 3 cursor. A client that makes regular requests for a "next message" on a given topic will see their cursor progressed through the history list faster than that cursor of a client with a history of making infrequent requests on that topic. The size of the message history is preferably configured by the application developer, or by an administrator.

On any HTTP redirect response, a location field in the protocol is required for inclusion in the redirect response. The location field indicates the new URI to which the client should be redirected. Preferably, and in addition to the new URI in the redirect location field, a hyperlink to the new URI is included in the entity, or body of the message. The presence of the redirect URI in the obligatory location field allows use of the redirect response as a container for a client's message. The message body could contain both the redirect URI hyperlink and client's message in a predetermined format. As such, leaving the redirect URI out of the redirect response by the response entity is an acceptable messaging practice.

Figure 3:
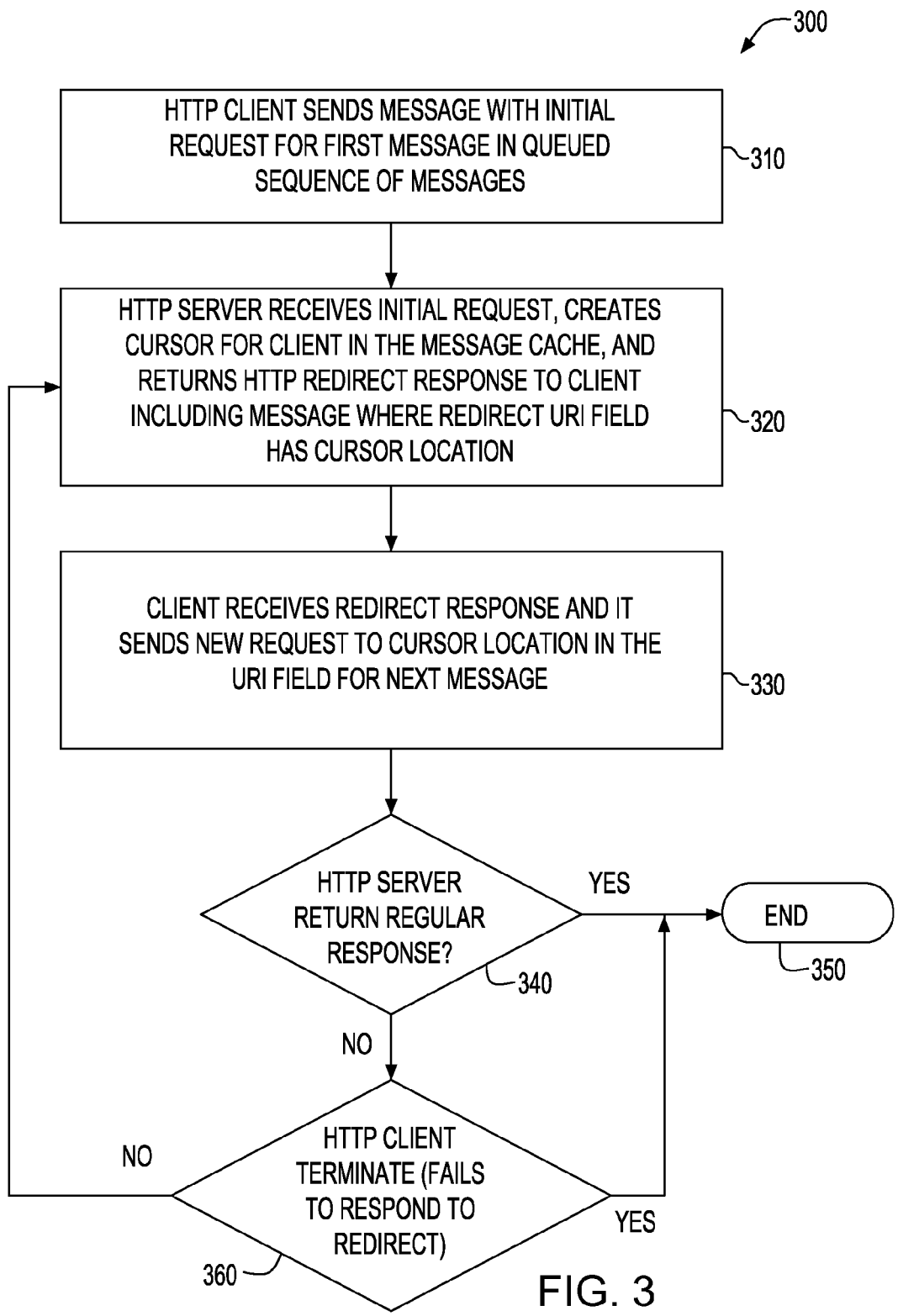
FIG. 3 is a schematic flow diagram of a method for distributing cached messages in a load-balance publish/subscribe messaging network that uses HTTP redirects of the invention.

A method (300) for distributing cached messages in a load-balanced publish/subscribe messaging network, preferably including point-to-point messaging capability using an HTTP redirect in response to an HTTP client message request is shown in FIG. 3. In the method, the redirect response includes a URI at which a next message in a list of sequential messages slated for the HTTP client per the request is located. The HTTP client uses the URI to automatically iterate through and receive the entire list of sequential messages. The method includes various steps as follows:

Step (310): The HTTP client sends a message with an initial request for a first or next message in a queued sequence of messages.

Step (320): The HTTP server receives the message for the initial request and creates a cursor in the message cache for that client. The reader should note that this inventive operation is based on an assumption that different clients may also request the same messages, and as such deleting the message from the cache is not viable. The HTTP server returns an HTTP redirect response to the client. Inside the body of the HTTP response message is the message at the current cursor location.

Step (330): Upon receipt of the redirect response, and in keeping with the HTTP 1.1 protocol, the HTTP client opens (sends) a new request to the cursor location contained in the URI location field in the redirect response, to secure the next message in the queue (if at all) on the topic. Again, the URI filed contains information about the new cursor position, allowing the client to automatically redirect to the position of the next message in the cache without actually having to explicitly maintain or understand this information.

Step (340): If the HTTP server returns a regular HTTP response, e.g., "HTTP 200," or some other indicator for the end of a sequence of messages, program flow ends, as represented by flow operator (350). If not, program flow progresses to step (350).

Step (360): If the HTTP client terminates the loop, that is, the process of receiving all messages comprising a sequence of messages on the topic, by not responding to a redirect returned by the HTTP server, program flow ends, as represented by flow operator (350). If not (there are still messages in the sequence of messages), the program flow is directed to step (320). Steps (320), (330), (340) and (350) repeat until the transfer of messages is complete, or the client terminates. Put another way, steps (320) and (330) repeat until either: a) the HTTP server returns a regular response ("HTTP 200") instead of a redirect, indicating the end of a message sequence for some reason, or b) the HTTP client terminates the loop itself by not honoring the redirect returned by the HTTP server.

Although a few examples of the present invention have been shown and described, it would be appreciated by those skilled in the art that changes might be made in these embodiments without departing from the principles and spirit of the invention, the scope of which is defined in the claims and their equivalents.

What is claimed is:

1. A method for distributing cached messages in a load-balanced publish/subscribe messaging network using an HTTP redirect in response to an HTTP client message request, the redirect response including a URI field at which a next message in a list of sequential messages slated for a HTTP client per the request is located, wherein the HTTP client uses the URI field to automatically iterate through and receive the entire list of sequential messages, the method comprising steps of:
   a) the HTTP client initiating a request for a next message in a sequence of messages;
   b) a HTTP server receiving the request and creating and inserting a client cursor in a message cache for a current client cursor cache location of the requested next message, and returning a HTTP redirect response to the HTTP client including the current client cursor cache location for the requested next message in the URI field in the redirect response enabling the HTTP client to directly access the message cache to retrieve each next message in the sequence;
   c) the HTTP client receiving the redirect response directly from the HTTP server, sending a new request to the current client cursor cache location in accordance with the URI field in the redirect response to secure the each next message and retrieving the each next message from the current client cursor cache location in the message cache; and d) the HTTP server automatically moving the current client cursor cache location in the message cache according to a speed of retrieving, by the HTTP client, of the each next message in the message cache;

wherein steps b) and c) are repeated until the HTTP server returns a response other than a redirect response, or until the HTTP client fails to respond to a redirect response, wherein the message cache stores a history of messages published on each topic, and the messages in the message cache are served to different HTTP clients at different times based on HTTP clients' associated cursor locations in the message cache that is accessible to the different HTTP clients.

2. The method as set forth in claim 1, wherein the message cache is located at the HTTP server.

3. The method as set forth in claim 1, wherein the message cache is located at the HTTP client.

4. The method as set forth in claim 1, wherein the message cache is located at a location that is separate from the HTTP server and HTTP client.

5. The method as set forth in claim 1, wherein the messaging supports point-to-point messaging.

6. A publish/subscribe messaging system, comprising:

a plurality of HTTP client subscribers, each HTTP client subscriber implemented by at least one computer-based system, that request messages by topic;

a plurality of HTTP servers, each HTTP server implemented by at least one computer-based system, that respond to message requests by topic and/or content;

a plurality of HTTP client publishers, each HTTP client publisher implemented by at least one computer-based system, associated with each HTTP server, which HTTP client publishers respond to requests for messages by topic;

a message cache, accessible to different HTTP client subscribers, for storing a history of messages published on each topic, the message cache including client cursors associated with the different HTTP client subscribers, inserted by one or more of the HTTP servers, a client cursor identifying a location of a "next" message in the message cache for an HTTP client subscriber; and a HTTP server responding to a "next" message request by the HTTP client subscriber using a redirect response that includes a URI field of the the client cursor, in the message cache, and the HTTP client subscriber receiving the redirect response including the URI filed of the client cursor directly from the HTTP server, and using the URI field of the client cursor to retrieve next messages in the sequence of messages slated for the HTTP client subscriber the HTTP server automatically moving the current client cursor cache location in the message cache according to a speed of retrieving, by the HTTP client subscriber, of the next messages in the message cache, wherein the messages in the message cache are served to the different HTTP client subscribers at different times based on associated client cursors' locations in the message cache.

7. The publish/subscribe messaging system as set forth in claim 6, wherein the message cache is located at the HTTP server.

8. The publish/subscribe messaging system as set forth in claim 6, wherein the message cache is located at the HTTP client subscriber.

9. The publish/subscribe messaging system as set forth in claim 6, wherein the message cache is located at a location that is separate from the HTTP server and HTTP client subscriber.

10. The publish/subscribe messaging system as set forth in claim 6, wherein the messages include point-to-point messages.

11. A non-transitory storage medium readable by a processing circuit and storing computer-readable instructions for execution by the processing circuit for performing a method for distributing cached messages in a load-balanced publish/subscribe messaging network using an HTTP redirect in response to an HTTP client message request, the redirect response including a URI field at which a next message in a list of sequential messages slated for the HTTP client per the request is located, wherein the HTTP client uses the URI field to automatically iterate through and receive the entire list of sequential messages, the method comprising steps of:

a) the HTTP client initiating a request for a next message in a sequence of messages;

b) a HTTP server receiving the request and creating and inserting a client cursor in a message cache for a current client cursor cache location of the requested next message, and returning a HTTP redirect response to the HTTP client including the current client cursor cache location for the requested next message in the URI field in the redirect response enabling the HTTP client to directly access the message cache to retrieve each next message in the sequence;

c) the HTTP client receiving the redirect response directly from the HTTP server, opening (sending) a new request to the current client cursor location in accordance with the URI field in the redirect response to secure the each next message and retrieving the each next message from the current client cursor location in the message cache; and d) the HTTP server automatically moving the current client cursor cache location in the message cache according to a speed of retrieving, by the HTTP client, of the each next message in the message cache;

wherein steps b) and c) are repeated until the HTTP server returns a response other than a redirect response, or until the HTTP client fails to respond to a redirect response, wherein the message cache stores a history of messages published on each topic, and the messages in the message cache are served to different HTTP clients at different times based on HTTP clients' associated cursor locations in the message cache that is accessible to the different HTTP clients.

12. The storage medium as set forth in claim 11, wherein the message cache is located at the HTTP server.

13. The storage medium as set forth in claim 11, wherein the message cache is located at the HTTP client.

14. The storage medium as set forth in claim 11, wherein the message cache is located at a location that is separate from the HTTP server and HTTP client.

15. The storage medium as set forth in claim 1, wherein the messaging supports point-to-point messaging.

16. The method according to claim 1, wherein the message cache is located at a location that is separate from the HTTP server and the HTTP client.

* * * * *